United States Patent [19]

Lavis

[11] 4,163,404
[45] Aug. 7, 1979

[54] POWER SAWS

[76] Inventor: Leon J. Lavis, 30 Elkin Ave., Heatherbrae, New South Wales, 2324, Australia

[21] Appl. No.: 895,479

[22] Filed: Apr. 11, 1978

[30] Foreign Application Priority Data

Apr. 12, 1977 [AU] Australia .................. PC9717

[51] Int. Cl.² .............................................. B27B 9/04
[52] U.S. Cl. ........................................ 83/165; 83/397; 83/471.3; 83/486.1; 83/574
[58] Field of Search .................. 83/165, 397, 471.2, 83/471.3, 477.1, 484, 485, 486, 486.1, 574

[56] References Cited

U.S. PATENT DOCUMENTS

| 2,120,897 | 6/1938 | Miller | 83/486.1 |
| 2,556,137 | 6/1951 | Emmons | 83/574 |
| 2,718,907 | 9/1955 | Fjalstad | 83/486.1 X |

Primary Examiner—J. M. Meister
Attorney, Agent, or Firm—Fisher, Christen & Sabol

[57] ABSTRACT

Means for operable mounting a power saw upon a base support such as a work bench. The mounting means is adapted and arranged to permit a power saw supported therein to be rotated in a horizontal plane and tilted in a vertical plane to perform various functions and to be inverted in the mounting means to perform additional functions. The mounting means is applicable to known power saws and various makes and is manually transportable and readily erectable on any form or base support such as a work bench.

11 Claims, 9 Drawing Figures

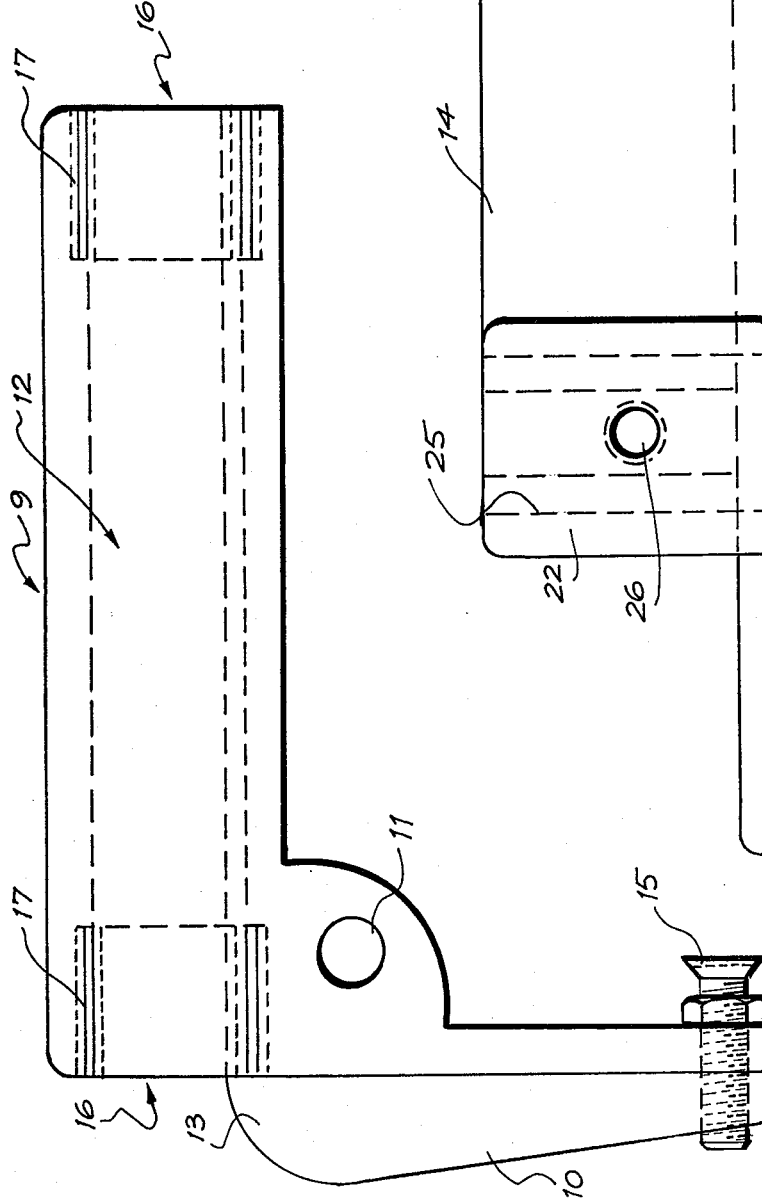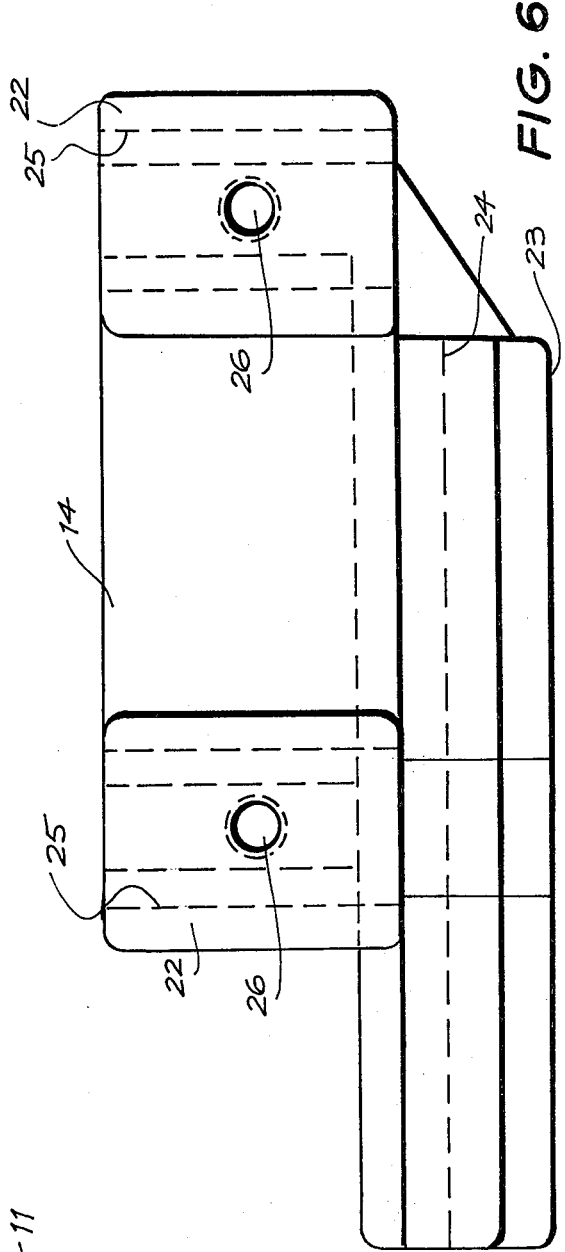

POWER SAWS

This invention has been devised to provide means for operably mounting a power saw upon a base support such as a work bench, whereby the power saw can be readily adapted to perform various functions such as a drop saw, a radial docking saw, a mitre saw, or as a bench rip saw, and whereby the arrangement of the saw and the said mounting means is such that an assembly is provided which is portable and can be readily transported—for example in a car boot—and quickly installed for operation at any desired location.

The present invention may adapt any known power saw for the various uses referred to, such as those saws which are used for the cutting and machining of timber, metal and ceramics, thus enlarging the field of use of power saws in a manner not previously known hitherto, particularly on site.

In the building industry for example, use of a saw which is mounted in accordance with the invention, greatly reduces the time which would otherwise be required, for carrying out on the site or in the factory, cutting of wall studs, roof timbers and the like.

According to the invention, the mounting means comprises: a power saw supporting cradle mounted upon a pedestal adapted to be secured to the base support, said cradle being rotatable in a horizontal plane and tiltable in a vertical plane on said pedestal; said cradle including slide bars supported upon the pedestal and projecting through opposite sides of said pedestal, and clamps supported on the slide bars, said clamps being adapted to clamp a power saw base plate therebetween; one said slide bar being longer than the other whereby it has a limb extending beyond the pedestal a greater distance than the other slide bar on one side of said pedestal, both said slide bars projecting substantially the same distance on the opposite side of said pedestal depending on the length of said base plate; one said clamp being mounted upon the limb and the other said clamp being fixed on the slide bars on said one side of the pedestal; whereby said power saw assembly when secured between the clamps in one position can be raised, lowered and traversed by the cradle across a work piece for performing a plurality of functions on said work piece; and whereby the power saw assembly can be moved through 180° to an inverted position relative to said work piece for performing an additional function on said work piece, by removing and inverting said cradle in said pedestal.

An embodiment of the mounting means of the invention will be described with reference to the annexed drawings, wherein:

FIG. 5 is a side view of the housing of FIG. 4.

FIG. 6 is a plan view of a (rear) clamp forming part of the mounting means.

FIG. 7 is a side view of the clamp of FIG. 6.

FIGS. 8 and 9 are similar views to FIGS. 6 and 7, of a (front) clamp forming part of the mounting means, and also showing a clamp tightening knob.

Figure 1:
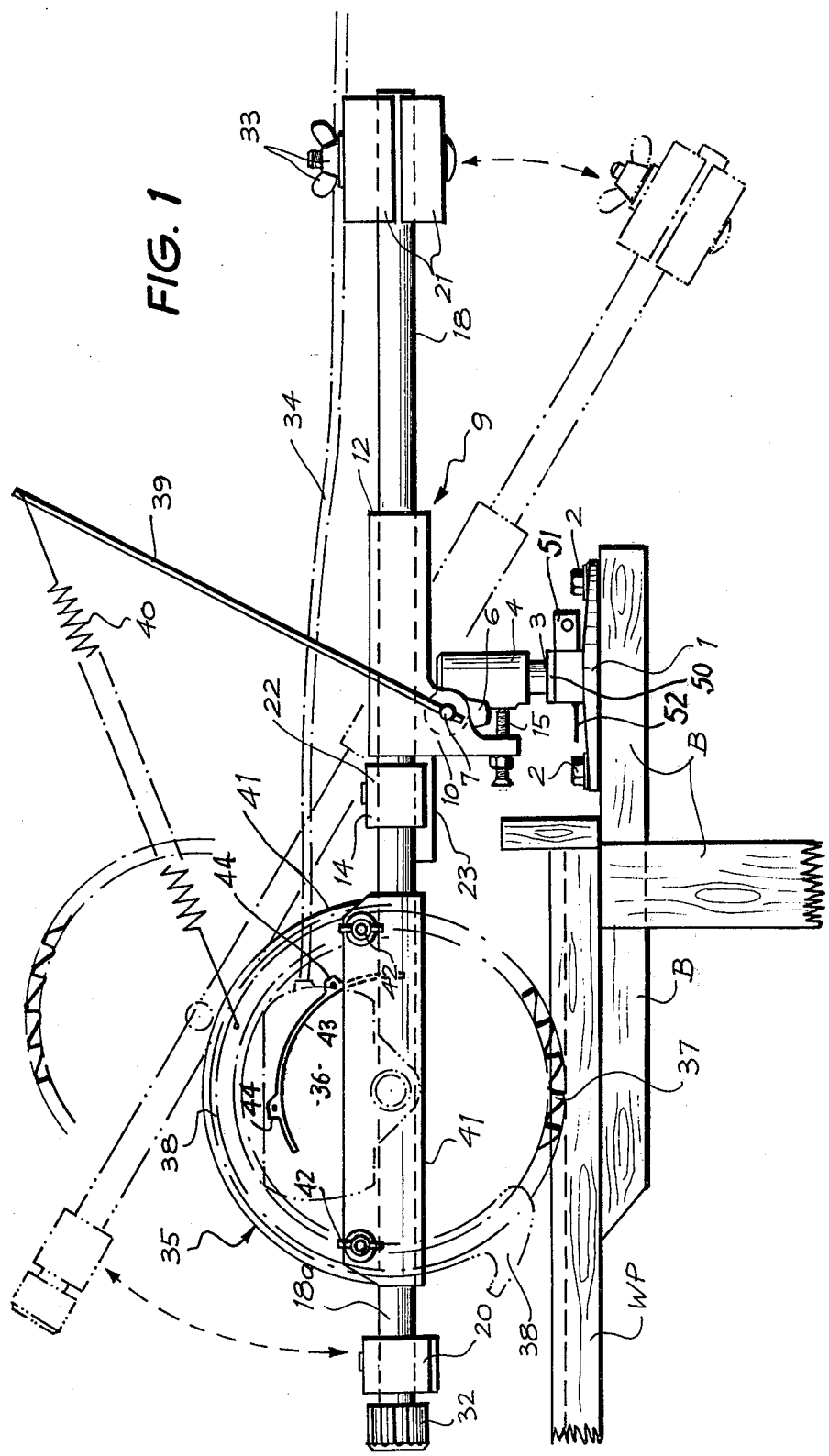
FIG. 1 is a side view of the mounting means secured upon a bench and having a power saw assembly operably mounted therein.
Figure 2:
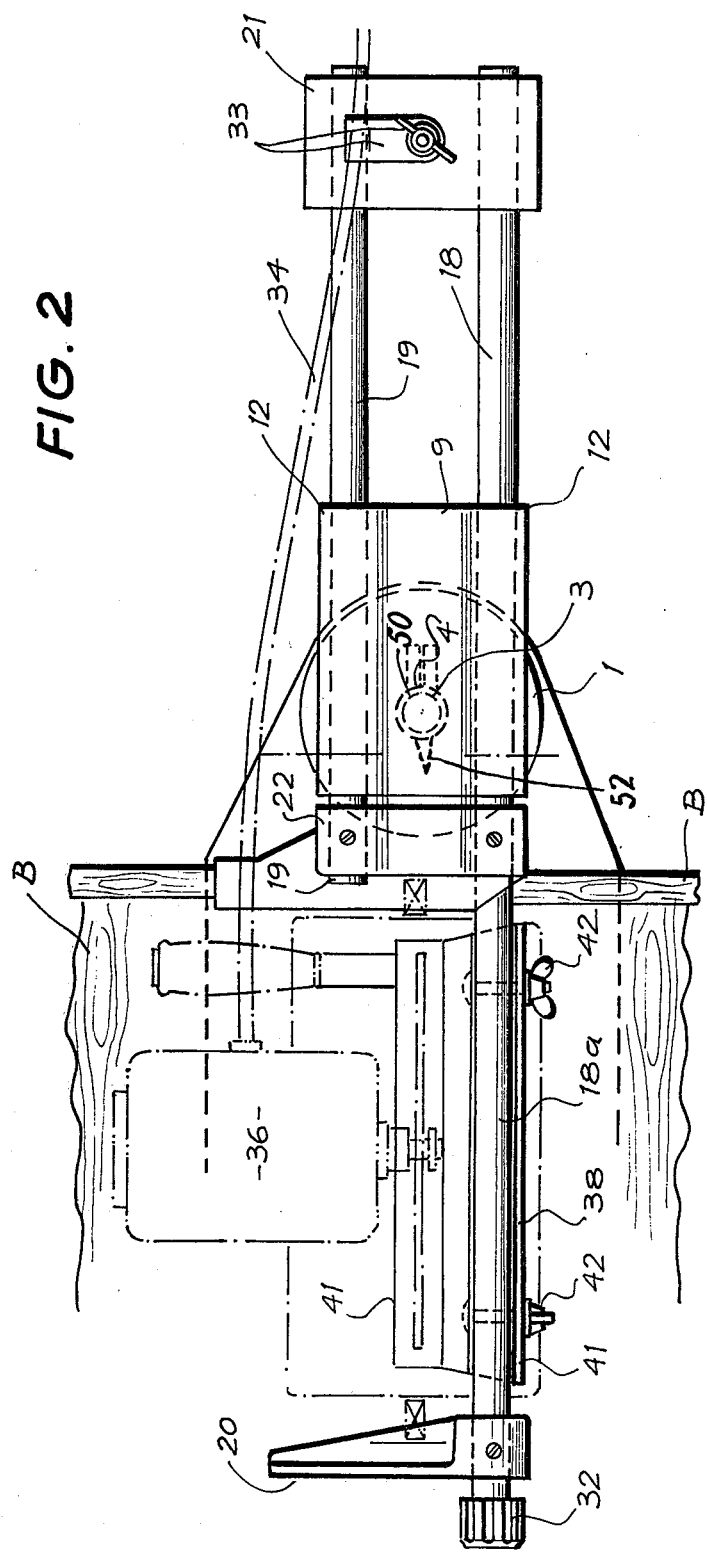
FIG. 2 is a plan view according to FIG. 1.
Figure 3:
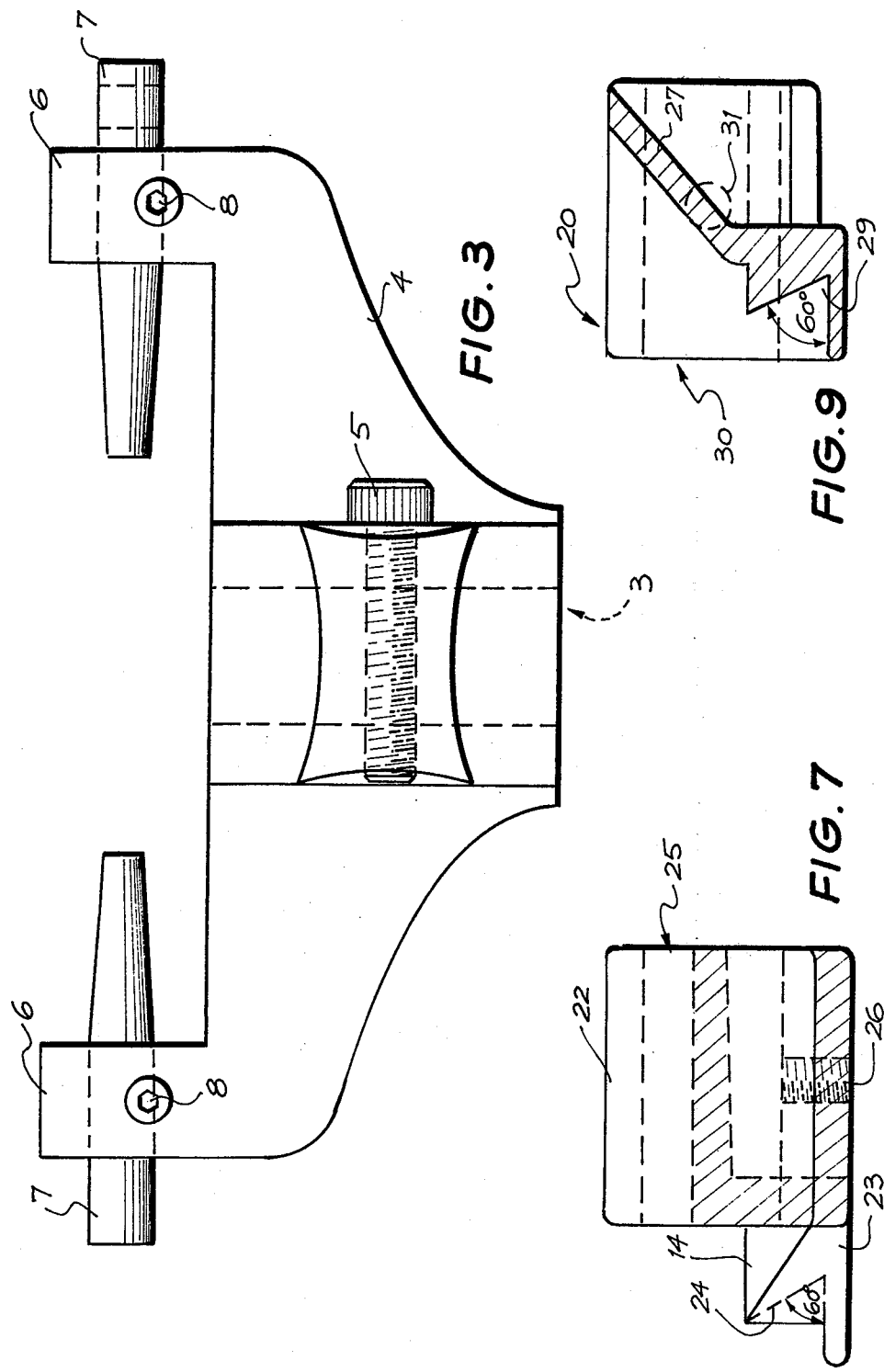
FIG. 3 is a plan view of a crosshead forming part of the mounting means.
Figure 4:
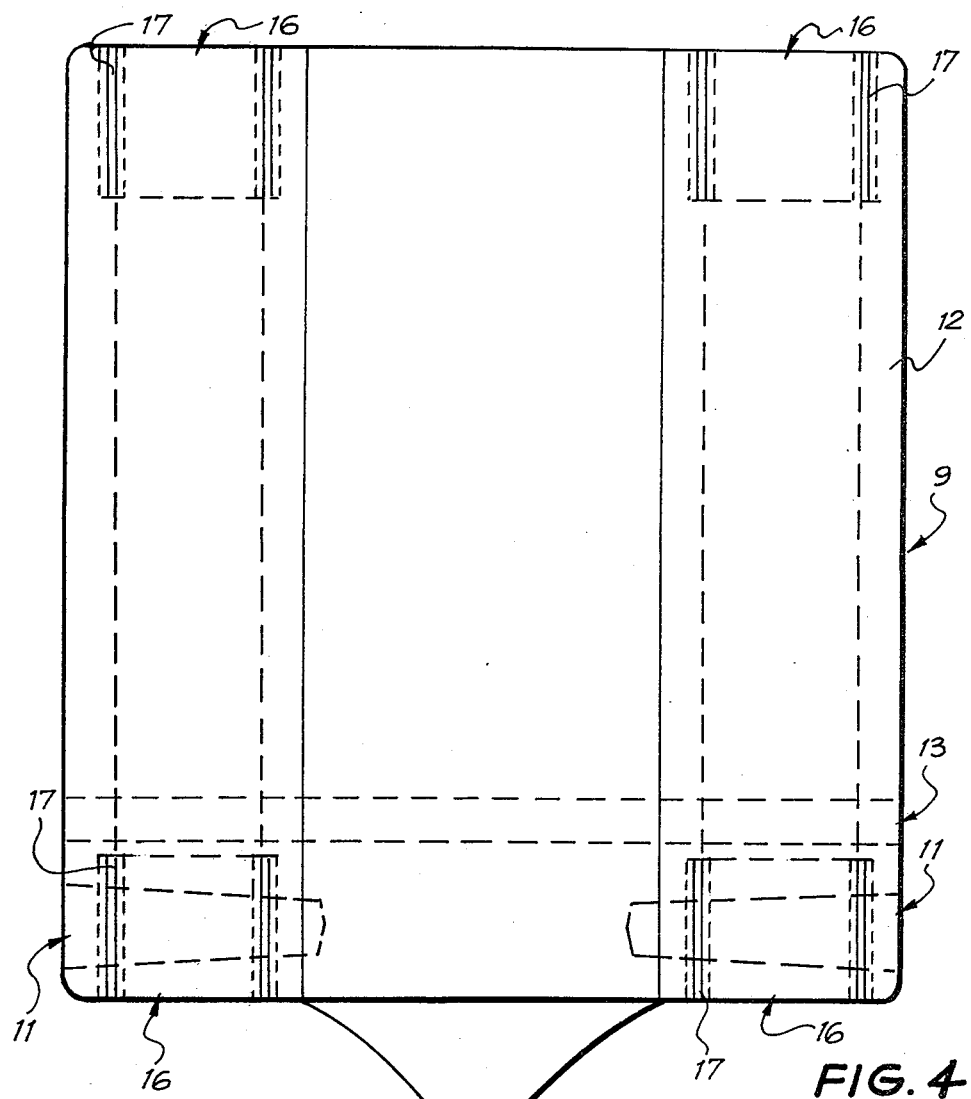
FIG. 4 is a plan view of a housing forming part of a saw supporting cradle forming part of the invention.
Figure 8:
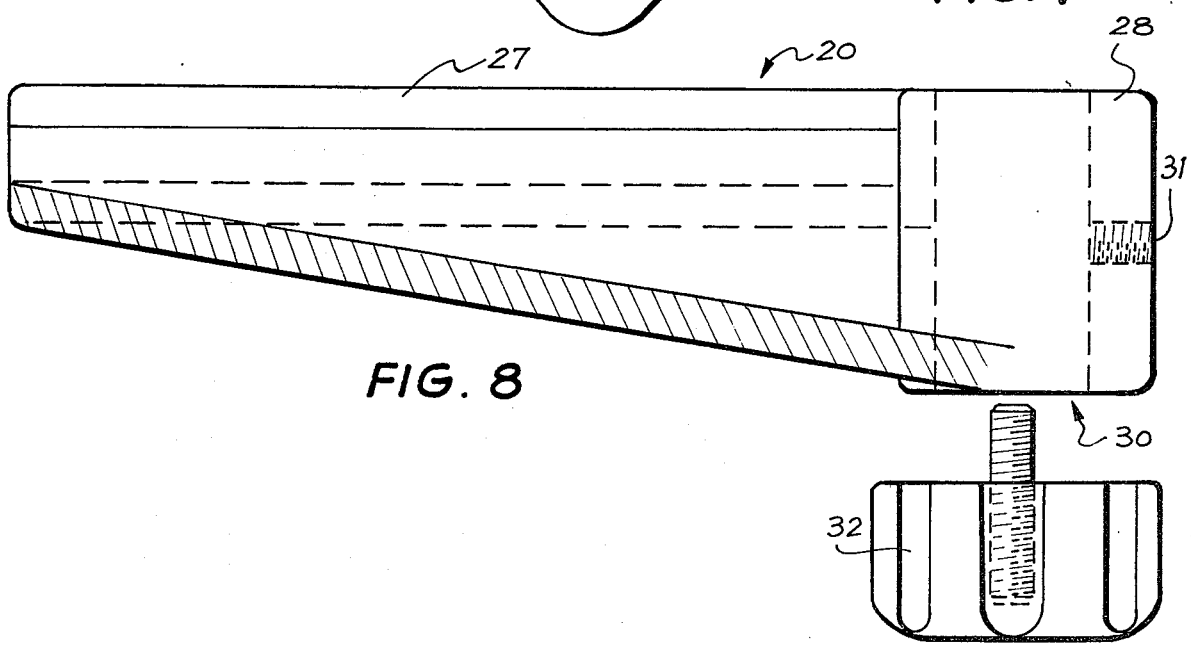

The embodiment illustrated comprises a base member 1 which is adapted to be bolted for example as at 2 to a base support such as a work bench B.

The base member 1 rotatably supports a vertically disposed pedestal shaft or column 3 and a crosshead 4 is clamped by a fixing screw 5 on the upper end of column 3. The crosshead 4 includes two integral, oppositely disposed mounting lugs 6 in each of which a tapered pivot pin 7 is fixed by set screws 8 as shown, the pivot pins 7 being axially aligned. The assembly of base member 1, column 3 and crosshead 4 will be referred to hereafter as a pedestal and it is preferred that the base member 1 has a graduated scale engraved around its upper surface. A collar 50 is provided in the mounting of column 3 on the base member 1. It is secured by a grub screw on the column 3 and it abuts a clamping block forming part of the base member 1. The clamping block 51 is bolted to the lower end of column 3 and the collar 50 carries a pointer 52 which projects to the graduated scale. When it is desired to rotate the crosshead 4 and hence the saw assembly to a desired degree in the block 51, the bolt in said block 51 is slackened to permit the column 3 to rotate as required and during this operation, the collar 50 prevents column 3 for dropping in block 51.

The pivot pins 7 rotatably support a housing 9 forming part of a saw supporting cradle. The housing 9 includes a body portion 10 which is formed to be located between the lugs 6 of the crosshead, and oppositely aligned bearing openings 11 which are formed in said body portion 10, are located and aligned to receive the pivot pins 7. Said housing 9 also includes a pair of parallel slide guides 12 and a support shoulder 13 for a rear clamp 14. The body 10 has a stop 15—illustrated as a screw and locknut arrangement—mounted in the lower end thereof. The stop 15 normally abuts the crosshead 4 and provides a levelling adjustment for the housing 9. Also, the slide guides 12 have parallel, circular bores 16 formed therethrough and bushes 17 are mounted in each end of said bores 16.

The saw supporting cradle also includes: a pair of slide bars 18, 19 slidably mounted and supported in the slide guides 12; the said rear clamp 14 which is adapted to be fixed on the bars 18, 19 in abutting relationship with the housing 9 upon the shoulder 13; a front clamp 20 adapted to be removably mounted upon the outer end of bar 18; and a counterbalance 21 secured upon the end of the bar 19 remote from the front clamp 20.

The slide bar 18 is length dimensioned to provide a limb 18a which projects through its slide guide 12 on one said of the pedestal, a sufficient distance to support a power saw assembly to be described, the front clamp 20 and the rear clamp 14, on said side of said pedestal. The slide bar 19 is length dimensioned to project through its slide guide 12 a sufficient distance on said one side of the pedestal, to support the rear clamp 14 only. Both slide bars 18, 19 project through housing 9 on the opposite side of said pedestal, a predetermined amount whereby power saw bases of different lengths can be clamped between said clamps 14, 20 on said one side of the pedestal. That is, in the illustrated embodiment, the slide bars 18, 19 project from said opposite side of the pedestal substantially the same distance. However, said slide bar 18 may be moved in one direction or the other to clamp the saw base of different makes of power saw.

The rear clamp 14 includes a pair of integrally formed bosses 22 and a base portion 23 having a V-shaped groove 24 formed longitudinally therein. Each boss 22 has a slide guide bore 25 formed longitudinally therethrough adapted to register with a registering slide guide 12 in the housing 9, and also has a set screw hole 26 formed transversely therethrough whereby said clamp 14 is fixed upon the bars 18, 19. The V-shaped groove 24 forms one side of a support for the power saw base plate and the underside of the clamp base portion 23 rests upon the shoulder 13 formed on the housing 9.

The front clamp 20 includes a body portion 27 having an integral boss 28 formed on one end thereof at rightangles to said body portion 27, and a V-shaped groove 29 of the same shape and dimensions as the V-shaped groove 24, formed longitudinally therein. The boss 28 has a slide guide bore 30 formed therethrough for mounting the bracket 20 on the outer end of shaft 18 and a set-screw hole 31 is formed transversely through the boss 28 for securing said bracket 20 upon said shaft 18. Also a knob 32 is adapted and arranged to be screwed into the outer end of limb 18a. This knob 32 provides the means whereby the front clamp 20 is tightened on to the base plate of the power saw.

The counterbalance 21 consists of a pair of blocks (top and bottom blocks) clamped upon the end of the bar 19. The bar 18 projects with clearance, through the pair of blocks. One of these blocks releasably supports a holder 33 for the electric cable 34 for the saw motor.

The power saw assembly generally indicated by reference 35, includes a motor 36, a circular saw 37, a rotatable guard 38 supplied with the power saw and this assembly is conventional and does not form part of the invention. It will be observed that one of the pivot pins 7 supports one end of a rod 39, the other end of which has one end of a guard spring 40 fixed thereto. The other end of the spring 40 is connected to the guard 38. In addition to the guard 38, the invention includes a saw cover 41 mounted on the guard 38 by metal threads and wing nuts indicated at 42. A chip thrower plate 43 is rivetted as indicated at 44 on the inside of the saw cover 41. It deflects shavings away from the work piece in a trenching operation, and also prevents build-up of shavings in the guard. It will be understood that the thrower plate 43 and saw cover 41 may be of unitary construction.

The power saw includes a base plate (not shown), which is adapted to be mounted in the V-shaped grooves 24, 29 provided in the brackets 14,20 whereby said assembly is firmly supported by and between said clamps 14,20.

The arrangement described provides means whereby the saw assembly 35 can be used in an up and down operation as a docking or drop saw, and whereby the saw blade 37 can be lifted above and clear of the work piece WP placed on bench B, traversed across and past the work piece and then lowered to be pushed through the workpiece as a radial docking saw. In this latter operation, the saw blade 37 thus does not have to be reversed and functions in its normal operating direction. This feature also provides that the saw blade 37 does not jam in the work piece during a said docking operation.

For a bench ripping operation the saw assembly is inverted in its mounting in the saw supporting frame by removing the counterbalance 21 and then sliding the bars 18, 19 out of the slide guides 12 and then inverting the saw assembly. For the ripping operation, a table top for supporting the workpiece is secured to and between the clamps 14,20 on to the limb 18a. The table top is suitably slotted to provide a passageway for the saw blade 37, and the workpiece is pushed through the saw blade 37 in known manner.

For mitre cutting, or for cutting at any angle from 90° to 10°, the saw assembly 35 is mounted in the saw supporting frame as for the drop saw and docking operations and the angular adjustment provided in the saw assembly is adapted to cut to the angle required within the range of adjustment provided.

It will be understood that the materials from which various components forming the mounting means of this invention may be chosen as required, to meet strength requirements and weight factor requirements. Also various forms of cross-head and saw supporting frame may be devised for the purpose of allowing these components, and other components associated therewith, to be manufactured by mass production techniques. The crosshead 4 and saw supporting frame incorporates bearings as required in addition to the counter-balance means 21. The stop 15 is included for restricting tilting rotary movement of the saw assembly 35.

I claim:

1. Mounting means for operably mounting a power saw upon a base support; wherein the power saw includes an assembly of a driving motor, a saw blade mounted on the motor shaft, guard means for the saw blade, and a base plate supporting the power saw assembly; said mounting means comprising: a power saw supporting cradle mounted upon a pedestal adapted to be secured to the base support, said cradle being rotatable in a horizontal plane and tiltable in a vertical plane on said pedestal; said cradle including slide bars supported upon the pedestal and projecting through opposite side of said pedestal, and clamps supported on the slide bars, said clamps being adapted to clamp the power saw base therebetween; one said slide bar being longer than the other whereby it has a limb extending beyond the pedestal a greater distance than the other slide bar on one side of said pedestal, both said slide bars projecting substantially the same distance on the opposite side of said pedestal depending upon the length of said base plate; one said clamp being mounted upon the limb and the other said clamp being fixed on the slide bars on said one side of the pedestal; whereby said power saw assembly when secured between the clamps in one position can be raised, lowered and traversed by the cradle across a work piece for performing a plurality of functions on said work piece; and whereby the power saw assembly can be moved through 180° to an inverted position relative to said work piece for performing an additional function on said work piece, by removing and inverting said cradle in said pedestal.

2. Mounting means according to claim 1, wherein the pedestal comprises a base member adapted to be secured to a base support, a vertically disposed column rotatably mounted at its lower end in the base member, and a crosshead fixed on the upper end of the column.

3. Mounting means according to claim 1, wherein the cradle includes a housing for the slide bars tiltably mounted on the crosshead, said housing including a pair of parallel slide guides in which the slide bars are slidably mounted, and a support shoulder for the clamp fixed on said slide bars.

4. Mounting means according to claim 3, wherein the housing also includes a body portion having oppositely aligned bearing openings formed therein whereby said housing is mounted upon pivot pins mounted in the crosshead for tilting movement of the cradle in a vertical plane.

5. Mounting means according to claim 1, wherein the clamp mounted upon said limb includes a body portion having an integral boss formed on one end thereof at right angles to said body portion, and a V-shaped groove formed longitudinally in said body portion, said boss having a slide guide bore formed therethrough for mounting said clamp upon said limb, said V-shaped groove being adapted to engage an edge of the power saw base plate.

6. Mounting means according to claim 1, wherein the clamp fixed on the slide bars includes integrally formed bosses and a base portion, each said boss having a slide guide bore formed therethrough whereby the said clamp is mounted on the slide bars, said base portion having a V-shaped groove formed longitudinally therein adapted to engage an edge of the power saw base plate.

7. Mounting means according to claim 4, wherein the housing body has a stop mounted therein for abutting engagement with the crosshead, thereby providing a levelling adjustment for the cradle.

8. Mounting means according to claim 1, wherein the said other slide bar has counterbalance means mounted thereon on said opposite side of the pedestal.

9. Mounting means according to claim 8, wherein the counterbalance means supports a holder for an electric cable for the saw motor.

10. Mounting means according to claim 1, wherein the lower end of the column is releasably secured in a clamping block forming part of the base plate, and a collar fixed on the column abuts the mounting block.

11. Mounting means according to claim 1, wherein the guard means has a saw cover mounted thereon, and wherein the saw cover carries a chip thrower plate adapted and arranged to deflect shavings away from the work piece.

* * * * *